Patented Nov. 2, 1926.

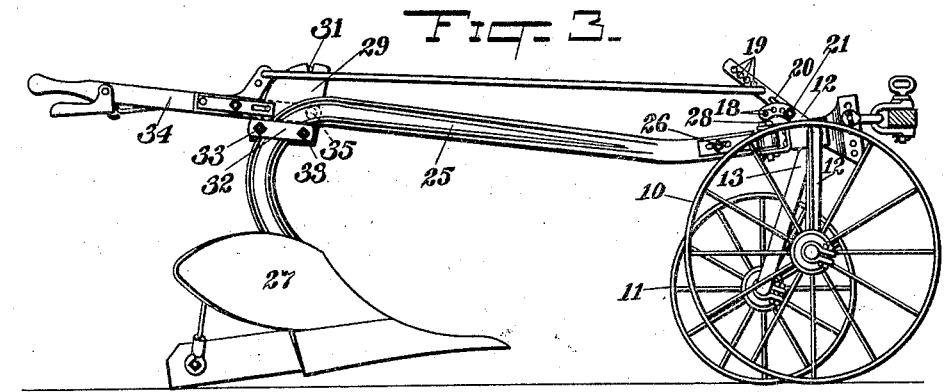
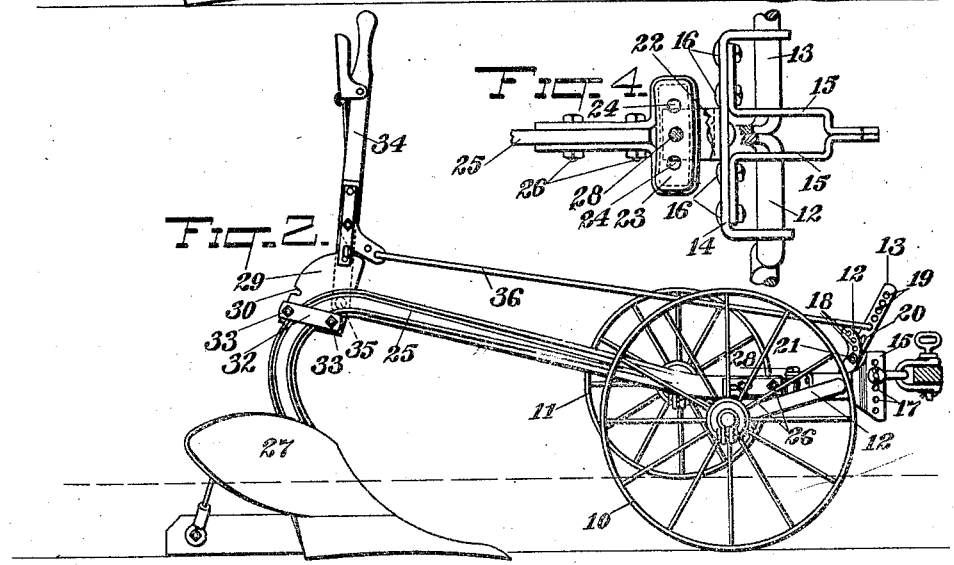
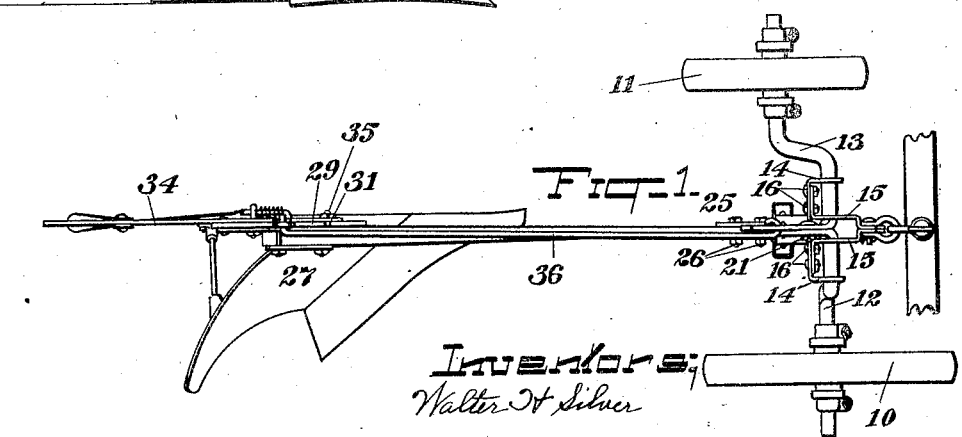

1,605,078

UNITED STATES PATENT OFFICE.

WALTER H. SILVER, OF MOLINE, ILLINOIS, ASSIGNOR TO DEERE & COMPANY, OF MOLINE, ILLINOIS, A CORPORATION OF ILLINOIS.

FORECARRIAGE.

Application filed April 19, 1921. Serial No. 462,647.

This invention relates to a forecarriage adapted for use with plows.

An object of the invention is to provide a forecarriage that will maintain the plow in proper working position after adjustment without aid from the operator. A further object is to provide a forecarriage that is free to move laterally in respect to the plow and that will hold the plow in an upright position when turning. Other objects are to provide a forecarriage that provides means for adjusting the depth of plowing, that permits the plow to be raised or lowered by the operation of a single lever and that when set to any one certain adjustment will always permit the plow to turn to the same depth after being raised.

Referring to the drawings in which like numerals indicate identical parts.

Figure 1 is a top plan view of my forecarriage attached to a plow.

Figure 2 is a side elevation of Figure 1 showing the plow in lowered position.

Figure 3 is a similar view to Figure 2 showing the plow in raised position.

Figure 4 is a detail view showing the manner of attaching the forecarriage to the plow beam.

In the drawings; 10 and 11 indicate supporting wheels rotatably mounted upon horizontally, outwardly disposed, lower portions of crank axles 12 and 13 respectively. The wheel 10, being the furrow wheel, is of larger diameter than the wheel 11, which runs on the land and consequently at a higher level than the wheel 10, when the plow is in operation. The cranked axles 12 and 13 have inwardly disposed horizontal portions which are journaled in transversely alined bearings in a U-shaped frame member 14 and a forwardly extending draft member composed of frame bars 15. Thus two pivotal supports are provided for each axle. The rear portions of the bars 15 are secured to the frame member 14 by means of bolts 16 and extend forwardly therefrom in parallel relationship to a point near their forward ends where they are brought together and form a clevis plate in which are a series of vertically spaced openings 17.

The opposed ends of the cranked axles 12 and 13 after passing through the member 14 and the bars 15 are flattened and bent upwardly and are brought together, the flattened portion of the axle 12 having a rearward curve and a series of spaced holes 18. The flattened portion of the axle 13 is in the form of a lever 13ª that extends upwardly past the end of the axle 12 and it is provided with a series of spaced holes 19. In the flattened portion of the axle 13 is a slot 20, and the axles 12 and 13 are secured together by means of a bolt 21 passing through one of the holes 18 and the slot 20. The wheel 10 can be shifted to level the plow by removing the bolt 21 and rocking the axle 12, and when the level has been attained the bolt 21 is again inserted in the slot 20 and through the hole 19 with which it registers and by a nut in the bolt the flattened portions are again rigidly held together. The crank end of the axle 12 is sufficiently lengthened to allow the wheel 10 to be adjusted longitudinally thereof if necessary to retain the wheel 10 in a furrow after a change in the pivotal connection of the plow to the forecarriage.

Attached to and extending rearwardly from the member 14 is a horizontally disposed clevis 22 which engages a clevis plate 23 having laterally spaced holes 24. The clevis plate 23 is attached to the forward portion of a plow beam 25 by bolts 26. The beam 25 carries a plow body 27. The clevis 22 is held in pivotal engagement with the clevis plate 23 by means of a bolt 28 extending through suitable openings in the clevis and one of the holes 24 in the clevis plate 23. By shifting the clevis plate 23 until the landward hole 24 engages with the bolt 28, the plow will take less land, and if the clevis plate is shifted so that the furrowward hole engages with the bolt 28 the plow will take more land, but the flexible connection of the plow and forecarriage remains constant irrespective of the relative location of the pivot bolt 28 and clevis plate 23.

A sector 29 having notches 30 and 31 is clamped to the rear portion of the beam 25 by means of a strap 32 and bolts 33. A lever 34 is pivoted at 35 to the sector 29 and carries the usual latch and dog device adapted to engage with the notches 30 and 31. A rod 36 is pivotally connected to the lever 34 and extends forwardly to connection with either of the holes 19 in the axle 13. By forward actuation of the lever 34 the axles 12 and 13 are rocked rearwardly carrying with them the wheels 10 and 11, and when the lever latch engages with the notch 31 the plow is lowered and will penetrate and turn the soil to the depth fixed by adjustment of the rod 36 to one of the holes 19, and by reversing the movement of the lever 34 the axles will be rocked in the opposite direction, carrying the wheels forwardly, tilting the beam 25 so that the upward inclination of the plow body will cause the latter to break from the ground, with the further advance of the plow, to the position assumed in Figure 3, and it will be noted that when the plow is out of the ground the pivot bolt 28 and the connection of the rod 36 with the axle 13 are in substantially vertical alinement, as shown in Figure 1, and the plow and forecarriage are free to swing relative to each other without binding action of the parts.

I claim—

1. The combination with a plow beam and a plow carried thereby, of a forecarriage comprising a frame having transversely alined bearings and land and furrow axles having horizontal portions mounted to rock in said bearings respectively, a substantially vertical pivot connecting the forward end of said beam with said frame, a lever mounted on the rear portion of the plow beam, means adapted to be actuated by said lever for rocking said axles to raise or lower the front end of the beam, and means whereby the point of connection of the beam with said frame may be adjusted transversely.

2. The combination with a plow beam and a plow carried thereby, of a forecarriage comprising a frame having transversely alined bearings and land and furrow wheel axles having horizontal portions mounted to rock in said bearings respectively, means whereby said land and furrow wheel axles may be adjustably held in fixed angular relation to each other, a substantially vertical pivot connecting the front end of the beam with said frame, a lever mounted on the rear portion of the beam, and means adapted to be actuated by said lever for rocking said axles in unison to raise or lower the front end of the beam.

3. The combination of a forecarriage having a frame and supporting wheels; crank axles rockably journaled in alinement on the frame and having their inner ends bent upwardly and in contact; means to secure said upwardly bent ends together; a plow pivotally connected to the frame by a vertical pivot; means to vary, laterally, the pivotal connection of the plow with the frame; means to adjust said upwardly bent ends of the axles relative to each other to level the plow; and means to rock said axles to raise or lower the plow.

4. The combination with a plow beam and a plow carried thereby, of a forecarriage comprising a frame and land and furrow axles pivotally mounted in aligned bearings in said frame, one of said axles having a lever at its inner end, and the other of said axles having an arm abutting against said lever and adjustably connected therewith, whereby said axles may be angularly adjusted relatively to each other, a pivot connecting the beam with said frame, and a lever mounted on the rear portion of the beam and connected with said first mentioned lever for actuating the same to raise or lower the front end of the beam.

WALTER H. SILVER.